United States Patent Office 2,836,972
Patented June 3, 1958

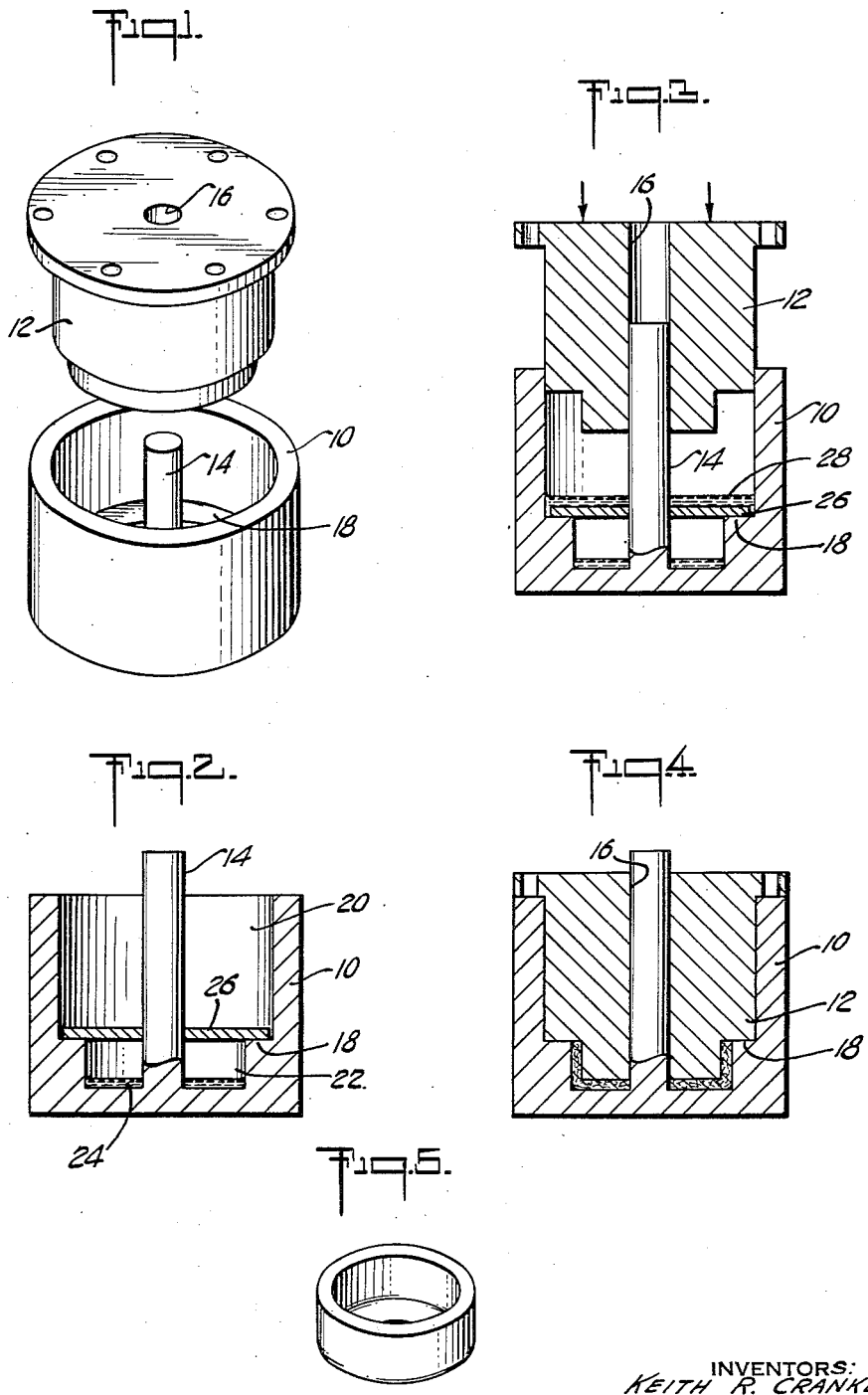

2,836,972
IMPREGNATING AND MOLDING OF LEATHER

Keith R. Cranker, Trenton, N. J., and Daniel J. Smith, Elkton, Md., assignors to Thiokol Chemical Corporation, Trenton, N. J., a corporation of Delaware Application December 30, 1954, Serial No. 478,594

5 Claims. (Cl. 69—21)

This invention relates to the manufacture of molded leather products impregnated with an organic polythiol polymer to render them substantially non-porous. More particularly the invention relates to a novel molding procedure for producing such products wherein the impregnation of the leather, the molding of the leather, and to some extent the curing of the impregnant are effected substantially simultaneously. The present invention is especially useful in connection with the molding of leather objects such as pump packings and will be illustratively described in connection with such a typical application, although as the description proceeds it will become apparent that the invention may be employed with advantage for a variety of other purposes as well.

In the molding of leather pump packings it is usually desirable to impregnate the leather with a suitable impregnant to reduce the porosity of the leather and various impregnating agents have been proposed for this purpose. It has been found that certain of the polythiol polymers are especially useful for this purpose because of their resistance to petroleum products such as oils and greases. Liquid polythio polymers of the type indicated below can be effectively used for the impregnation of leather pump packings and when properly cured in situ in the leather not only render the packing substantially non-porous but also resist attack by the lubricants employed in lubricating the pump.

It has been found, however, that the impregnation process presents certain problems that have heretofore caused difficulty. The liquid polymer is quite viscous and if the packing is molded before impregnation an excessively high impregnating pressure or an excessively long period of impregnation or both may be required to fill the pores of the leather with the liquid polymer. If on the other hand the leather is impregnated before molding, the liquid polymer tends to be squeezed out during the molding operation. This squeezing out of the liquid polymer can be avoided by curing the polymer in situ before the leather is molded but if this is done, there is a tendency for the leather to crack during molding.

It is accordingly an object of the present invention to provide a novel and improved method of producing impregnated molded leather articles such as pump packings, diaphragms and the like. It is another object of the invention to provide a method of making such molded leather articles and avoid the deficiencies of the prior processes outlined above. Other objects of the invention will be in part obvious and in part pointed out hereafter.

In one of its broader aspects the present invention comprises a method of making impregnated molded leather articles wherein the impregnation and molding of the leather are carried out concurrently. As indicated above, the impregnant is essentially composed of a liquid polythiol polymer and any of various known types of such polymers can be used. For example the liquid polymers disclosed in Patrick Patent 2,466,963 can be used with advantage.

Curing of the polythiol polymer is effected in situ after the liquid polymer has been forced into the leather and by proper selection of molding compositions the polymer can be partially cured during the molding operation. Completion of the cure can be effected in most cases at room temperature, although more rapid curing can be achieved at elevated temperatures, e. g. temperatures of the order of 160° F.

The curing agent can be introduced into the leather either prior to or during the molding operation. For example, if a liquid curing agent is used, the leather can be pre-impregnated with the curing agent by immersion therein prior to molding. If the curing agent is a solid the leather can be pre-impregnated therewith by dissolving the curing agent in a suitable solvent which is subsequently evaporated to deposit the curing agent in the pores of the leather. Alternatively, the curing agent can be mixed with the liquid polymer and introduced into the pores of the leather simultaneously with the polymer during the molding operation. Any of various curing agents known to be effective in curing the polysulfide polymers can be used and a number of different curing agents are referred to the specific examples set forth hereafter.

The general method of carrying out the method of the present invention can be most conveniently described with reference to the accompanying drawing which illustrates apparatus capable of carrying out a preferred embodiment of the present method.

In the drawings:

Figure 1 is a perspective view of a two-part molding apparatus with the mold and die disengaged from one another;

Figure 2 is a vertical axial section through the molding apparatus showing a leather disk positioned therein;

Figure 3 is a vertical axial section through the mold similar to Figure 2 but showing the die engaged therewith;

Figure 4 is a section similar to Figure 3 but showing the molding apparatus in closed or molding position; and Figure 5 is a perspective view of a cup-shaped washer or packing of the type that is molded in this mold.

Referring to the drawings and more particularly to Figure 1, the molding apparatus there shown comprises a generally cup-shaped mold 10 and cooperating die 12. The mold 10 is provided with a central guidepost 14 and the die 12 has a central bore 16 through which the post 14 passes to center the die as it enters the mold 10.

Referring now to Figure 2 the mold 10 has an internal annular shoulder 18 which in effect divides the interior of the mold into a space 20 of relatively large diameter and an annular channel 22 surrounding the post 14. In carrying out the present method a small quantity of impregnant 24 is placed in a bottom of channel 22 of mold 10 and thereafter a blank to be molded in the form of a leather disk 26 having a central hole that passes over the guide post 14 is positioned in the mold with its peripheral portion resting on the shoulder 18. As indicated above and pointed out more fully hereafter, the impregnant 24 may be a liquid polysulfide polymer or mixture of liquid polysulfide polymer and curing agent or a mixture of polymer and curing agent containing various other materials such as a catalyst, a stabilizer and the like.

Referring now to Figure 3 of the drawing, when the blank 26 has been positioned on the shoulder 18 a further quantity of impregnant 28 is placed on top of the blank 26. Thereafter the die 12 is positioned over the guide post 14 and forced into the mold 12 to mold the blank 26 into the configuration illustrated in Figures 4 and 5 of the drawings. The molding conditions used are conventional that is to say the mold and its contents are maintained at a temperature of say 250° F. to 350° F., and a pressure of the order of 5000 to 8000 lbs. per square inch is used. As in incident of the molding operation, the impregnant is forced into the pores of the leather and due to the elevated temperature is partially cured therein as the molding operation is carried out. The molding is desirably effected in a period of 1 to 3 minutes, after which die 12 is disengaged from mold 10 and the molded washer removed therefrom. The extent of cure that takes place during molding and consequently the amount of subsequent curing required depends both upon the molding conditions and upon the nature of the curing agent employed. Illustrative curing schedules are given in the specific examples below.

In order to point out more fully the nature of the present invention, the following specific examples are given of illustrative methods of carrying out the invention.

Example I

An annular-shaped piece of chrome re-tanned leather 2¼" in diameter by ⅛ inch thick and weighing about 10 grams was pre-impregnated with a 2% solution of the cobalt salt of 2-ethylhexoic acid in a solvent which is a mixture of equal volumes of toluol and methylethyl ketone. Impregnation was effected by immersing the leather disk in the cobalt salt solution for a period of 10 minutes at about 80° F. Thereafter the leather disk was withdrawn and dried and placed in a mold with a quantity of polysulfide polymer above and below it as described above. The polymer used was a mercaptan-terminated polymer essentially composed of aliphatic oxahydrocarbon radicals interconnected by polysulfide groups and having a molecular weight of about 1200. About 10 to 15 grams of the polymer was used with approximately half of this quantity being placed above the leather washer and the other half below.

The leather disk was then molded to form a cup-shaped washer as described above using a platen pressure of 6000 lbs. per square inch and a temperature of 300° F. for about 2 minutes. During the molding operation the polymer was forced into the pores of the leather and into intimate contact with the curing agent. When the washer was removed from the mold it was found that over 50% of the cure had occurred during the molding operation.

To complete the cure the washer was maintained at 80° F. for a period of 24 hours. At the end of this time the washer was tested, and it was found that substantially 100% of the voids in the leather blank had been filled with the impregnant and that the washer was completely impermeable.

Example II

A leather disk of the same type as that used in Example I was pre-impregnated with a 20% by weight solution of lead octoate in toluol, then dried and impregnated under the molding conditions of Example I. The impregnant used was the polymer of Example I which was mixed with about 3% of its weight of dissolved sulphur prior to being introduced into the mold. It was found that the resulting molded washer when given a supplementary cure as in Example I, was substantially non-porous.

Example III

A leather blank of the type used in Example I and II was pre-impregnated with a 2% by weight solution of diphenyl guanidine in toluol. The leather blank was dried to remove the solvent therefrom and then molded and impregnated simultaneously under the molding conditions of Example I. The impregnant used was the polymer of Example I having dissolved therein 10% by weight of cumene hydroperoxide.

The molded washer produced by this procedure after completion of the curing as in Example I was also substantially non-porous.

Example IV

An impregnant mixture was prepared by mixing 100 parts of the polymer of Example I with 50 parts by weight of an epoxide resin having an epoxide equivalent of .5 mols per 100 grams, 10 parts by weight of a catalyst comprising equal weights of 2,4,6-tri(dimethylaminomethyl) phenol and salicylic acid. The salicylic acid acts as a stabilizing agent to prevent reaction of the epoxide resin and polysulfide polymer at room temperature, but becomes activated at the molding temperature to cause the reaction to proceed during the molding step.

In the procedure of the present example the leather disk was not pre-impregnated but was put into the mold with 8 grams of the mixture of polysulfide polymer, epoxide resin and catalyst. Thereafter simultaneous molding and impregnation of the leather blank were carried out under the molding conditions of Example I to produce a molded washer which was largely cured when removed from the mold.

Curing of the washer was completed as in Example I and the resulting washer was found to be substantially non-permeable. It is evident that the procedure of Example IV has the special advantage that no pre-impregnation of the leather blank with curing agent is required and the entire impregnation and molding step is carried out as a single operation.

In the procedure of Example IV it is desirable to avoid using an excess of the impregnant, since if an excess is used the excess impregnant is cured during the molding of the leather and is difficult to remove from the mold. This difficulty can be avoided by determining the amount of pore space in the untreated leather by a suitable preliminary test and introducing into the mold only enough impregnant to fill this predetermined pore space. The porosity of the leather will of course vary to some extent with different types of leather and different tanning treatments.

Example V

A leather blank was impregnated with a 5% solution of 2,4,6-(dimethylaminomethyl) phenol in toluol then dried and impregnated under the molding conditions of the previous examples. The impregnant used is the mixture of polysulfide polymer and epoxide resin having a 1:1 molar ratio of epoxide groups to thiol groups. The amine used as a pre-impregnant is a catalyst which promotes the reaction between the epoxide resin and polysulfide polymer.

It is found that leather washers molded in accordance with this procedure cured rapidly to yield a substantially impermeable material.

From the foregoing examples and description it will be recognized that the present invention provides a method of impregnating leather capable of achieving the objectives set forth at the beginning of the present specification. It is of course to be understood that the examples are illustrative only and that numerous changes can be made in the specific materials, proportions and conditions given without departing from the spirit of the invention set forth in the appended claims.

We claim:

1. The method of making a molded leather object impregnated with a polythiol polymer which comprises introducing into a mold a leather object to be molded a liquid polythiol polymer and a curing agent capable of reacting with said liquid polymer to convert it into solid form, said leather object and liquid polymer being separately introduced into said mold, and subjecting the leather object, liquid polymer and curing agent within said mold to heat and pressure to force said liquid polymer into the pores of said leather object, to mold said object, and to at least partially cure the polymer within said leather object.

2. The method of making a molded leather object having its pores substantially filled with a solid polythiol polymer to render said object substantially impermeable, which comprises introducing separately into a mold the leather object to be molded and a quantity of a liquid impregnant sufficient to fill the pores of said leather object, said impregnant being essentially composed of a mixture of a liquid aliphatic oxahydrocarbon polythio polymercaptan, an epoxy resin and a small quantity of an organic amine catalyst, and subjecting the leather object and impregnant within said mold to heat and pressure to force said impregnant into the pores of said leather object, to mold said object, and to at least partially cure the polythio polymer within said leather object.

3. A method according to claim 2 wherein said impregnant includes a small quantity of salicyclic acid whereby said polythiol polymer and epoxy resin are substantially non-reactive at room temperature but become reactive at the elevated temperature attained during the molding operation.

4. The method of making a molded leather object impregnated with a polythiol polymer which comprises impregnating the leather object to be molded with a curing agent, introducing separately into a mold the leather object pre-impregnated with said curing agent and a liquid polythio polymer capable of reacting with said curing agent to be cured thereby, and subjecting the leather object and liquid polymer to heat and pressure within said mold to force said liquid polymer into the pores of said leather object, to mold said object, and to at least partially cure the polymer within said leather object.

5. The method of making a molded leather object impregnated with a polythiol polymer which comprises pre-mixing a quantity of a liquid polythiol polymer and a curing agent capable of reacting with said liquid polymer to convert it into solid form, introducing separately into a mold the leather object to be molded and a quantity of said pre-mixed polymer and curing agent, and subjecting the leather object and liquid mixture to heat and pressure in said mold to force said liquid mixture into the pores of said leather object, to mold said object, and to at least partially cure the polymer within said leather object.

References Cited in the file of this patent

UNITED STATES PATENTS

| | | |
|---|---|---|
| 1,039,702 | Crouse et al. | Oct. 1, 1912 |
| 1,294,405 | Conrader | Feb. 18, 1919 |
| 1,443,311 | Cook | Jan. 23, 1923 |
| 2,088,158 | Spelman | July 27, 1937 |
| 2,466,963 | Patrick | Apr. 12, 1949 |
| 2,469,404 | Patrick | May 10, 1949 |
| 2,470,115 | Stewart | May 17, 1949 |
| 2,635,059 | Cheronis | Apr. 14, 1953 |